(12) United States Patent
Krishnamoorthy (10) Patent No.: US 11,200,458 B1
(45) Date of Patent: Dec. 14, 2021

(54) SYSTEM FOR INTEGRATION OF A HEXAGONAL IMAGE PROCESSING FRAMEWORK WITHIN A TECHNICAL ENVIRONMENT

(71) Applicant: Bank of America Corporation, Charlotte, NC (US)

(72) Inventor: Madhusudhanan Krishnamoorthy, Hasthinapuram (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 61 days.

(21) Appl. No.: 16/901,173

(22) Filed: Jun. 15, 2020

(51) Int. Cl.
    G06K 9/62 (2006.01)
    G06N 3/08 (2006.01)
    G06N 3/04 (2006.01)

(52) U.S. Cl.
    CPC ......... *G06K 9/6257* (2013.01); *G06K 9/6262* (2013.01); *G06N 3/0454* (2013.01); *G06N 3/08* (2013.01)

(58) Field of Classification Search
    CPC combination set(s) only.
    See application file for complete search history.

(56) References Cited

U.S. PATENT DOCUMENTS

| | | | |
|---|---|---|---|
| 5,361,328 A * | 11/1994 | Takatori | G06N 3/04 706/20 |
| 7,560,701 B2 | 7/2009 | Oggier et al. | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,683,954 B2 | 3/2010 | Ichikawa et al. | |

(Continued)

OTHER PUBLICATIONS

Tobias Schlosser, "Hexagonal Image Processing in the Context of Machine Learning: Conception of a Biologically Inspired Hexagonal Deep Learning Framework",Feb. 17, 2020, 2019 18th IEEE International Conference on Machine Learning and Applications (ICMLA),pp. 1866-1870.*

(Continued)

*Primary Examiner* — Omar S Ismail
(74) *Attorney, Agent, or Firm* — Michael A. Springs; Moore & Van Allen PLLC; Anup Shrinivasan Iyer (57) ABSTRACT

Systems, computer program products, and methods are described herein for integration of a hexagonal convolutional neural network (H-CNN) within an image processing technical environment. The present invention is configured to initiate a hexagonal convolutional neural network (H-CNN); train the H-CNN using the first set of digital images; train the S-CNN in the image processing technical environment using the first set of digital images; classify a second set of digital images using the S-CNN using the second set of parameters; electronically receive an indication that the S-CNN has misclassified at least one of the second set of digital images; transform the at least one of the second set of digital images misclassified by the S-CNN as additional training data for the H-CNN; and re-train the H-CNN with the additional training data, wherein re-training the H-CNN further comprises modifying the first set of parameters for classification.

20 Claims, 3 Drawing Sheets

(56) References Cited

U.S. PATENT DOCUMENTS

| | | |
|---|---|---|
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 9,115,986 B2 | 8/2015 | Heidemann et al. |
| 9,342,869 B2 | 5/2016 | Wang et al. |
| 9,599,455 B2 | 3/2017 | Heidemann et al. |
| 9,964,402 B2 | 5/2018 | Tohme et al. |
| 10,430,707 B2 | 10/2019 | Nakamura et al. |
| 10,444,021 B2 | 10/2019 | Hare |
| 10,609,361 B2 | 3/2020 | Mlinar et al. |
| 10,621,468 B2 | 4/2020 | Yang et al. |
| 10,643,320 B2 | 5/2020 | Lee et al. |
| 2017/0206431 A1* | 7/2017 | Sun .................. G06F 16/5838 |
| 2018/0025249 A1* | 1/2018 | Liu ........................ G06N 3/04 |
| | | 382/158 |
| 2020/0159809 A1* | 5/2020 | Catthoor .................. G06N 3/08 |
| 2021/0272298 A1* | 9/2021 | Leonard .................. G06T 7/337 |

OTHER PUBLICATIONS

Jintao Ke, "Hexagon-Based Convolutional Neural Network for Supply-Demand Forecasting of Ride-Sourcing Services," Dec. 7, 2018, IEEE Transactions on Intelligent Transportation Systems, vol. 20, No. 11, Nov. 2019, pp. 4160-4417.*

D. Nieto, "Studying deep convolutional neural networks with hexagonal lattices for imaging atmospheric Cherenkov telescope event reconstruction", Dec. 20, 2019, 36th International Cosmic Ray Conference—ICRC2019—Jul. 24-Aug. 1, 2019, Studying DCNs with hexagonal lattices for IACT eventreconstruction, pp. 1-4.*

Junren Luo, "Hexagonal Convolutional Neural Networks for Hexagonal Grids", Sep. 30, 2019, IEEE Access vol. 7, 2019, Digital Object Identifier 10.1109/ACCESS.2019.2944766, pp. 142738-142747.*

* cited by examiner

SYSTEM FOR INTEGRATION OF A HEXAGONAL IMAGE PROCESSING FRAMEWORK WITHIN A TECHNICAL ENVIRONMENT

FIELD OF THE INVENTION

The present invention embraces a system for integration of a hexagonal image processing framework within a technical environment.

BACKGROUND

Convolutional neural network (CNN), including a square-CNN (S-CNN) is a class of deep learning neural networks commonly used to analyze visual imagery in image classification. However, in image processing technical environments that implement S-CNNs, replacing the S-CNN with H-CNN may present a number of challenges. There is a need for a system for integration of a hexagonal image processing framework within a technical environment.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for integration of a hexagonal convolutional neural network (H-CNN) within an image processing technical environment is presented. The system comprising: at least one non-transitory storage device; and at least one processing device coupled to the at least one non-transitory storage device, wherein the at least one processing device is configured to: initiate a hexagonal convolutional neural network (H-CNN), wherein the H-CNN is configured to receive a first set of digital images from a digital image data repository to be used to train the H-CNN; establish a communication link with an image processing technical environment, wherein the image processing technical environment comprises a square convolutional neural network (S-CNN), wherein the S-CNN is configured to receive the first set of digital images from the digital image data repository to be used to train the S-CNN; train the H-CNN using the first set of digital images, wherein training the H-CNN comprises generating a first set of parameters for classification; train the S-CNN using the first set of digital images, wherein training the S-CNN comprises generating a second set of parameters for classification; electronically receive a second set of digital images from the digital image data repository to be used as a validation dataset to test the S-CNN; classify the second set of digital images using the S-CNN using the second set of parameters; electronically receive an indication that the S-CNN has misclassified at least one of the second set of digital images; transform the at least one of the second set of digital images misclassified by the S-CNN as additional training data for the H-CNN; and re-train the H-CNN with the additional training data, wherein re-training the H-CNN further comprises modifying the first set of parameters for classification.

In some embodiments, the at least one processing device is further configured to: classify the second set of digital images using the H-CNN using the first set of parameters; and determine a classification accuracy of the H-CNN based on at least classifying the second set of digital images using the first set of parameters.

In some embodiments, the at least one processing device is further configured to: determine a classification accuracy of the S-CNN based on at least classifying the second set of digital images using the second set of parameters.

In some embodiments, the at least one processing device is further configured to: continuously compare the classification accuracy of the H-CNN and the classification accuracy of the S-CNN; determine that the classification accuracy of the S-CNN is greater than the classification accuracy of the H-CNN based on at least the continuous comparison; and continue the implementation of the S-CNN on the image processing technical environment.

In some embodiments, the at least one processing device is further configured to: electronically receive a third set of digital images from the digital image data repository to be used as the validation dataset to test the H-CNN; classify the third set of digital images using the H-CNN using the modified first set of parameters; and determine the classification accuracy of the H-CNN based on at least classifying the third set of digital images using the modified first set of parameters.

In some embodiments, the at least one processing device is further configured to: classify the third set of digital images using the S-CNN using the second set of parameters; and determine a classification accuracy of the S-CNN based on at least classifying the third set of digital images using the second set of parameters.

In some embodiments, the at least one processing device is further configured to: determine that the classification accuracy of the H-CNN is greater than the classification accuracy of the S-CNN based on at least the continuous comparison; and replace the S-CNN currently implemented on the image processing technical environment with the H-CNN.

In another aspect, a computer program product for integration of a hexagonal convolutional neural network (H-CNN) within an image processing technical environment is presented. The computer program product comprising a non-transitory computer-readable medium comprising code causing a first apparatus to: initiate a hexagonal convolutional neural network (H-CNN), wherein the H-CNN is configured to receive a first set of digital images from a digital image data repository to be used to train the H-CNN; establish a communication link with an image processing technical environment, wherein the image processing technical environment comprises a square convolutional neural network (S-CNN), wherein the S-CNN is configured to receive the first set of digital images from the digital image data repository to be used to train the S-CNN; train the H-CNN using the first set of digital images, wherein training the H-CNN comprises generating a first set of parameters for classification; train the S-CNN using the first set of digital images, wherein training the S-CNN comprises generating a second set of parameters for classification; electronically receive a second set of digital images from the digital image data repository to be used as a validation dataset to test the S-CNN; classify the second set of digital images using the S-CNN using the second set of parameters; electronically receive an indication that the S-CNN has misclassified at least one of the second set of digital images; transform the at least one of the second set of digital images misclassified by the S-CNN as additional training data for the H-CNN; and re-train the H-CNN with the additional training data, wherein re-training the H-CNN further comprises modifying the first set of parameters for classification.

In yet another aspect, a method for integration of a hexagonal convolutional neural network (H-CNN) within an image processing technical environment is presented. The method comprising: initiating a hexagonal convolutional neural network (H-CNN), wherein the H-CNN is configured to receive a first set of digital images from a digital image data repository to be used to train the H-CNN; establishing a communication link with an image processing technical environment, wherein the image processing technical environment comprises a square convolutional neural network (S-CNN), wherein the S-CNN is configured to receive the first set of digital images from the digital image data repository to be used to train the S-CNN; training the H-CNN using the first set of digital images, wherein training the H-CNN comprises generating a first set of parameters for classification; training the S-CNN using the first set of digital images, wherein training the S-CNN comprises generating a second set of parameters for classification; electronically receiving a second set of digital images from the digital image data repository to be used as a validation dataset to test the S-CNN; classifying the second set of digital images using the S-CNN using the second set of parameters; electronically receiving an indication that the S-CNN has misclassified at least one of the second set of digital images; transforming the at least one of the second set of digital images misclassified by the S-CNN as additional training data for the H-CNN; and re-training the H-CNN with the additional training data, wherein re-training the H-CNN further comprises modifying the first set of parameters for classification.

The advantages of hexagonal convolutional neural network over conventional square convolutional neural network within the realm of image processing is described in "Hexagonal Image Processing in the Context of Machine Learning: Conception of a Biologically Inspired Hexagonal Deep Learning Framework," by Tobias Schlosser et al., which is incorporated by reference herein.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, a "resource" may generally refer to objects, products, devices, systems, hardware, software, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, a "resource transfer" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "technical environment" may refer to a platform of resources for building and running application, systems, and processes for developing and operating customized and tailored services. In one aspect, the resources in the technical environment may include but is not limited to operating systems to provide basic services required to use one or more hardware systems, computing platforms for providing functionality in areas such as cloud computing and virtualization, storage platforms for scalable storage of objects and files including APIs and value added services, application platforms for developing and deploying applications, web platforms that provide services that are useful to websites and web-based software as a service such as web servers, web applications servers, content delivery networks, and edge computing, content management systems for publishing and managing content, media and documents, application programming interface (API) platforms, analytics for capturing, processing, analyzing, and visualizing data, robotic platform with the framework for developing and deploying backend systems and services for automation on cloud infrastructure, Internet of Things (IoT), and/or one or more other similar resources. In some embodiments, an image processing technical environment may be a technical environment specifically designed and operated to execute image processing actions.

Figure 1:
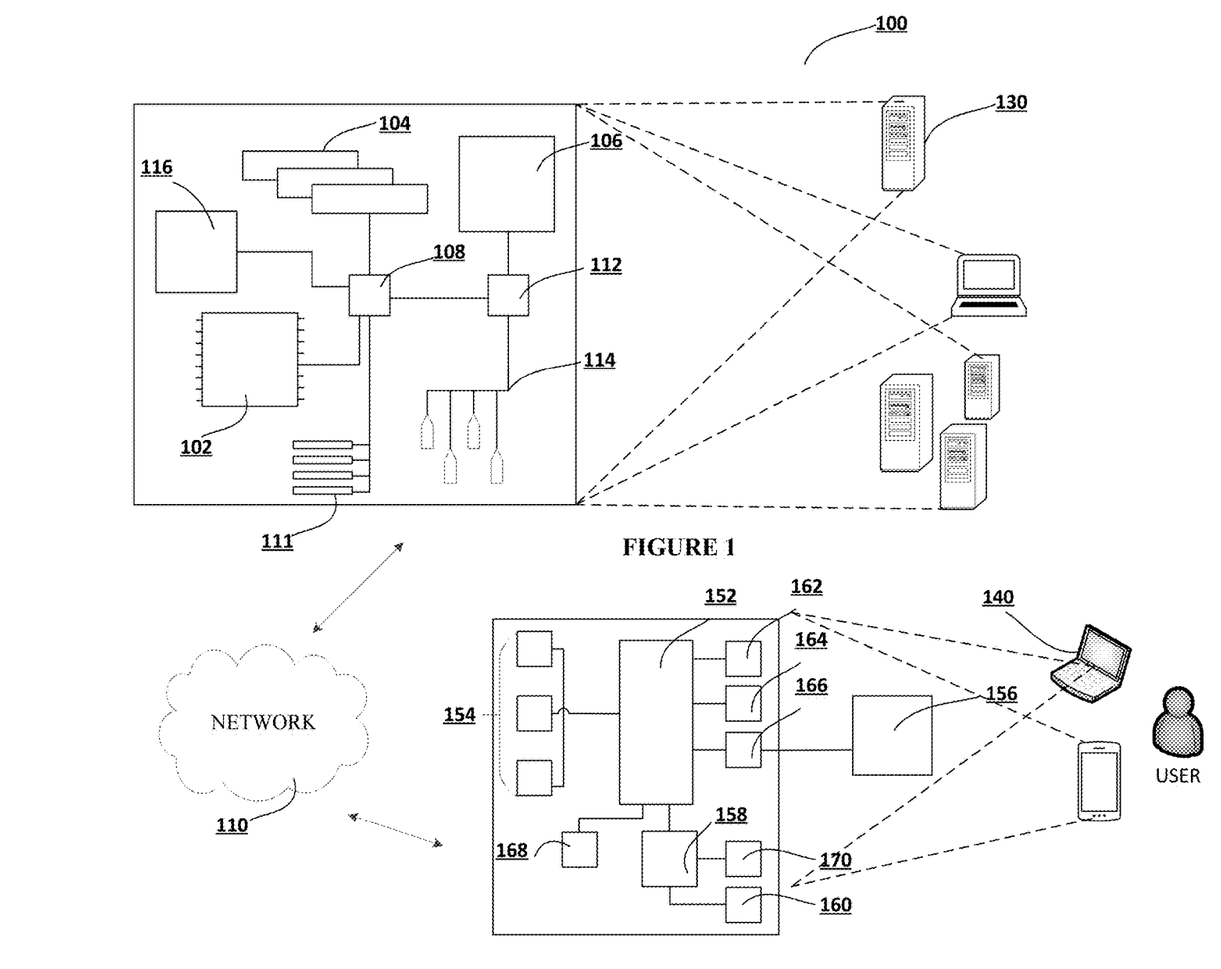
FIG. 1 illustrates technical components of a system for integration of a hexagonal convolutional neural network (H-CNN) within an image processing technical environment, in accordance with an embodiment of the invention.

FIG. 1 illustrates technical components of a system for integration of a hexagonal convolutional neural network (H-CNN) within an image processing technical environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Convolutional neural network (CNN) is a class of deep learning neural networks commonly used to analyze visual imagery in image classification. CNNs have an input layer, an output layer, and hidden layers. The hidden layers typically include convolutional layers, ReLU layers, pooling layers, and fully connected layers. Convolutional and pooling layers realize the filter-based convolution of features, abstract in their spatial dimensionality, and represent the extracted features in the form of feature maps according to their current depth in the network. Fully connected layers are then used to classify the represented features.

At the very beginning of the process, the digital image is divided into a plurality of grids, which are then used to extract features from the digital image. CNNs typically use a quadrangular (e.g., square) grid to tile a plane and capture information from a digital image, and are referred to as square convolutional neural networks (S-CNN). Hexagonal grids provide considerable advantages over quadrangular grids due to the six-fold rotational symmetry, which makes them suitable to tackle tasks of geospatial information processing and intelligent decision making. In H-CNNs, the square grids are replaced with hexagonal grids. However, in image processing technical environments that implement S-CNNs, replacing the S-CNN with H-CNN may present a number of challenges. The present invention provides the functional benefit of integrating a H-CNN within an image processing technical environment which currently employs an S-CNN, such that the classification accuracy of the image processing technical environment is improved and the transition from S-CNN to H-CNN is seamless.

Figure 2:
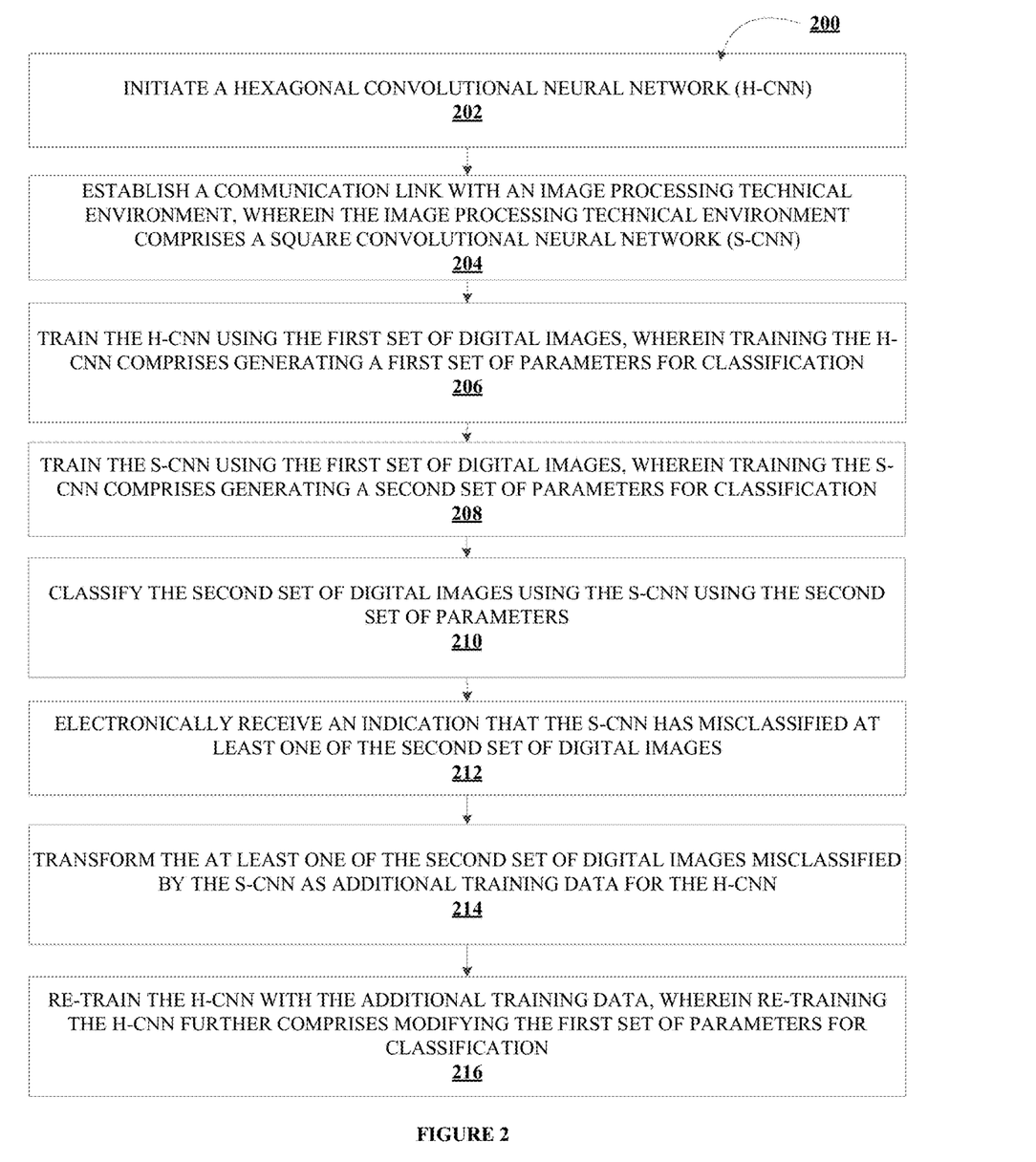
FIG. 2 illustrates a process flow for integration of a hexagonal convolutional neural network (H-CNN) within an image processing technical environment, in accordance with an embodiment of the invention.

FIG. 2 illustrates a process flow for integration of a hexagonal convolutional neural network (H-CNN) within an image processing technical environment 200, in accordance with an embodiment of the invention. As shown in block 202, the process flow includes initiating a hexagonal convolutional neural network (H-CNN). In some embodiments, the H-CNN may be configured to receive a first set of digital images from a digital image repository to be used to train the H-CNN.

Next, as shown in block 204, the process flow includes establishing a communication link with an image processing technical environment, wherein the image processing technical environment comprises a S-CNN. In some embodiments, the S-CNN may be configured to receive the first set of digital images from the digital image data repository to be used as training dataset to train the S-CNN.

Next, as shown in block 206, the process flow includes training the H-CNN using the first set of digital images, wherein training the H-CNN comprises generating a first set of parameters for classification. In some embodiments, the first set of parameters may be one or more weights within each layer in the H-CNN. In one aspect, the system may be configured to generate a training dataset for the H-CNN from the first set of digital images. In some embodiments, the training dataset may include at least a number of features extracted from the first set of digital images and one or more class labels associated with them.

In one aspect, training the H-CNN may include implementing an optimization algorithm that searches through a space of possible values for the H-CNN model parameters for a set of parameters (e.g., weights) that results in good performance on the training dataset generated from the first set of digital images. These set of parameters may be used to best map the inputs to the outputs. Typically, the training process is iterative, meaning that it progresses step by step with small updates to the set of parameters in each iteration and, in turn, a change in the performance of the training model each iteration. In some embodiments, the first set of parameters may be generated by solving the optimization problem that finds for parameters that result in minimum error or loss when evaluating the digital images in the first set of digital images.

Next, as shown in block 208, the process flow includes training the S-CNN using the first set of digital images, wherein training the S-CNN comprises generating a second set of parameters for classification. In some embodiments, the second set of parameters may be one or more weights within each layer in the S-CNN. In one aspect, the system may be configured to generate a training dataset for the S-CNN from the first set of digital images. In some embodiments, the training dataset may include at least a number of features extracted from the first set of digital images and one or more class labels associated with them.

In one aspect, similar to the training process in H-CNN, training the S-CNN may by iterative. Accordingly, the second set of parameters may be generated by solving the optimization problem that finds for parameters that result in minimum error or loss when evaluating the digital images in the first set of digital images.

In some embodiments, the system may be configured to electronically receive a second set of digital images from the digital image data repository to be used as a validation dataset to test the S-CNN. In one aspect, the second set of digital images and the first set of digital images are mutually exclusive to maintain data integrity. In some embodiments, the validation dataset may be generated using a similar computational process used to generate the training dataset for the S-CNN.

Next, as shown in block 210, the process flow includes classifying the second set of digital images using the S-CNN using the second set of parameters. In this regard, the S-CNN may be configured to apply the training model with the second set of parameters generated based on the training dataset on the validation dataset. In doing so, the S-CNN may be configured to determine a class label for each digital image in the second set of digital images. These class labels are then compared to the ground truth to determine the performance of the S-CNN training model. In some embodiments, the performance of the S-CNN training model may be determined by compared the determined class labels with the ground truth to determine a match.

Next, as shown in block 212, the process flow includes electronically receiving an indication that the S-CNN has misclassified at least one of the second set of digital images. In this regard, the system may be configured to determine which of the class labels associated with the second set of images do not match the ground truth. These class labels are then fed into the H-CNN for re-training the model.

Next, as shown in block 214, the process flow includes transforming the at least one of the second set of digital images misclassified by the S-CNN as additional training data for the H-CNN. In this regard, the H-CNN may be configured to extract one or more features from the at least one of the second set of digital images that were misclassified by the S-CNN based on at least implementing a hexagonal grid. Based on the extracted features, the H-CNN may be configured to generate an additional training data value from the additional training data. The additional training data value is then appended to the training dataset for the H-CNN, with the correct classification label.

Next, as shown in block 216, the process flow includes re-training the H-CNN with the additional training data, wherein re-training the H-CNN further comprises modifying the first set of parameters for classification. In one aspect, re-training the H-CNN using a training dataset with the additional training data value may result in a different set of weights for the layers in the convolutional neural network, thus presenting a modified first set of parameters.

In some embodiments, the system may be configured to continuously monitor the classification performance of H-CNN to determine whether it is viable as an alternative for 5-CNN within the image processing technical environment. In this regard, the system may be configured to determine a classification accuracy of the H-CNN. Typically, classification rate/classification accuracy is defined as the number of correctly classified patterns to the total number of patterns. It can also be defined as the ratio of sum of true positives (TP) and true negatives (TN) to the total number of trials [sum of TP, false positives (FP), false negatives (FN), and TN].

In some embodiments, the system may be configured to classify the second set of digital images using the H-CNN using the first set of parameters. Based on the classification of the second set of digital images, the system may be configured to determine a classification accuracy of the H-CNN. Similarly, the system may be configured to classify the second set of digital images using the S-CNN using the first set of parameters. Based on the classification of the second set of digital images, the system may be configured to determine a classification accuracy of the S-CNN. In some embodiments, the system may be configured to continuously compare the classification accuracy of the H-CNN and the classification accuracy of the S-CNN. In one aspect, the system may be configured to determine that the classification accuracy of the S-CNN is greater than the classification accuracy of the H-CNN based on at least the continuous comparison. In such situations, the system may be configured to continue the implementation of the S-CNN on the image processing technical environment.

In some embodiments, the system may be configured to electronically receive a third set of digital images from the digital image data repository to be used as the validation dataset to test the H-CNN. In response, the system may be configured to classify the third set of digital images using the H-CNN with the modified first set of parameters. Based on the classification of the third set of digital images, the system may be configured to determine the classification accuracy of the H-CNN. Similarly, the system may be configured to classify the third set of digital images using the S-CNN using the second set of parameters. Based on the classification of the third set of digital images, the system may be configured to determine the classification accuracy of the S-CNN. In one aspect, the system may be configured to determine that the classification accuracy of the H-CNN is greater than the classification accuracy of the S-CNN based on at least the continuous comparison, resulting in a convergence of performance. In such situations, the system may be configured to replace the S-CNN currently implemented on the image processing technical environment with the H-CNN.

In some embodiments, the system may be configured to generate a notification in response to determining that the classification accuracy of the H-CNN is greater than the classification accuracy of the S-CNN. In one aspect, the notification may include an authorization request to dismantle the S-CNN from the image processing technical environment and replace it with the H-CNN. In response, the system may be configured to transmit control signals configured to cause the user input system to display the notification. In response, the system may be configured to electronically receive from the user input system, an indication from the user input system to approve the authorization request. In some embodiments, the system may be configured to require the user to produce authentication credentials for verification of user identity prior to implementing the authorization request. In this regard, the system may be configured electronically receive one or more authentication credentials from the user, via the user input system. In response, the system may be configured to validate the one or more authentication credentials. Once validated, the system may be configured to verify the user identity. In response to verifying the user identity, the system may be configured to implement the authorization request and dismantle the S-CNN from the image processing technical environment and replace it with the H-CNN.

In some embodiments, the system may be configured to automatically dismantle the S-CNN from the image processing technical environment and replace it with the H-CNN in response to the determining that the classification accuracy of the H-CNN is greater than the classification accuracy of the S-CNN.

Figure 3:
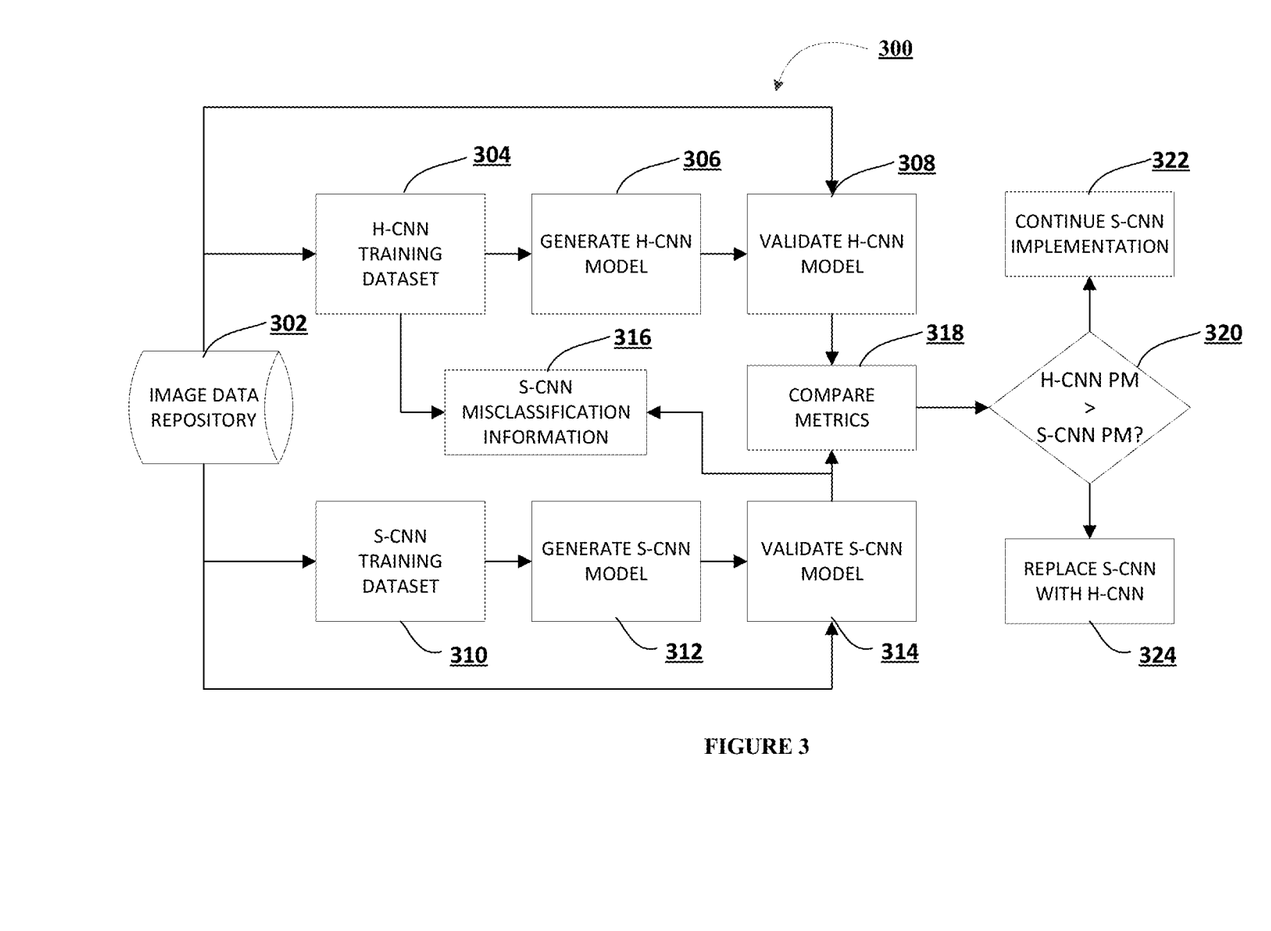
FIG. 3 illustrates a flow chart for integration of a hexagonal convolutional neural network (H-CNN) within an image processing technical environment, in accordance with an embodiment of the invention

FIG. 3 illustrates a flow chart for integration of a hexagonal convolutional neural network (H-CNN) within an image processing technical environment 300, in accordance with an embodiment of the invention. As shown in step 302, the first set of digital images, the second set of digital images, and the third set of digital images are retrieved from the digital image data repository. At step 304, the first set of digital images received from the digital image data repository are used to generate the H-CNN training dataset. At step 306, the training dataset is used to generate the H-CNN model where the first set of parameters are determined. At step 308, the H-CNN model is validated by implementing the trained H-CNN model on a validation dataset. As described herein, the validation dataset for the H-CNN is generated using the same or similar process as the training dataset for the H-CNN using a second set of digital images retrieved from the digital image data repository.

Similarly, at step 310, the first set of digital images received from the digital data repository are used to generate the S-CNN training dataset. At step 312, the training dataset is used to generate the S-CNN model where the second set of parameters are determined. At step 314, the S-CNN model is validated by implementing the trained S-CNN model on a validation dataset. Here, the validation dataset for the S-CNN is generated using the same or similar process as the training dataset for the S-CNN using the second set of digital images retrieved from the digital image data repository.

At step 316, any misclassifications by the S-CNN is fed into the H-CNN, which is then used to retrain the H-CNN model to generate a modified first set of parameters. By feeding the misclassified information from the S-CNN into the H-CNN training model continuously, the classification accuracy of the H-CNN will begin to reach the same levels of classification accuracy as that of the S-CNN, and ultimately, the H-CNN will begin performing better than S-CNN. At step 318, the S-CNN and H-CNN metrics are continuously compared. As described herein, the metrics include at least classification accuracy, computational costs, logarithmic loss, confusion matrix, area under curve, F1 score, mean absolute error, mean squared error, and/or the like. In some embodiments, the image processing technical environment may have specific performance requirements. Any CNN (S-CNN, H-CNN, or the like) implemented in such image processing technical environments must meet specific performance requirements to be integrated therein. In one aspect, the system may be configured to determine whether the performance metrics of the CNN meet the performance requirements of the image processing technical environment. To this extent, the system may be configured to assign weights to each performance metric depending on the performance requirements of the image processing technical environment. For example, some image processing technical environments require the best classification accuracy, regardless of the computational costs involved. In such cases, the classification accuracy is given a higher weight than the computational costs metric. Once the weights are assigned, in some embodiments, the system may be configured to determine the overall performance of the CNN as a weighted average of the performance metrics.

At step 320, the system may be configured to determine whether the H-CNN performance metrics (PM) are outperforming the S-CNN performance metrics. If the H-CNN performance metrics are not outperforming the S-CNN performance metrics, the system may be configured to continue S-CNN implementation, as shown in step 322. On the other hand, if the H-CNN performance metrics are outperforming the S-CNN performance metrics, the system may be configured to replace S-CNN with H-CNN in the image processing technical environment, as shown in step 324.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for integration of a hexagonal convolutional neural network (H-CNN) within an image processing technical environment, the system comprising:
   at least one non-transitory storage device; and
   at least one processing device coupled to the at least one non-transitory storage device, wherein the at least one processing device is configured to:
   initiate a hexagonal convolutional neural network (H-CNN), wherein the H-CNN is configured to receive a first set of digital images from a digital image data repository to be used to train the H-CNN;
   establish a communication link with an image processing technical environment, wherein the image processing technical environment comprises a square convolutional neural network (S-CNN), wherein the S-CNN is configured to receive the first set of digital images from the digital image data repository to be used to train the S-CNN;
   train the H-CNN using the first set of digital images, wherein training the H-CNN comprises generating a first set of parameters for classification;
   train the S-CNN using the first set of digital images, wherein training the S-CNN comprises generating a second set of parameters for classification;
   electronically receive a second set of digital images from the digital image data repository to be used as a validation dataset to test the S-CNN;
   classify the second set of digital images using the S-CNN using the second set of parameters;
   electronically receive an indication that the S-CNN has misclassified at least one of the second set of digital images;
   transform the at least one of the second set of digital images misclassified by the S-CNN as additional training data for the H-CNN; and
   re-train the H-CNN with the additional training data, wherein re-training the H-CNN further comprises modifying the first set of parameters for classification.

2. The system of claim 1, wherein the at least one processing device is further configured to:
   classify the second set of digital images using the H-CNN using the first set of parameters; and
   determine a classification accuracy of the H-CNN based on at least classifying the second set of digital images using the first set of parameters.

3. The system of claim 2, wherein the at least one processing device is further configured to:
    determine a classification accuracy of the S-CNN based on at least classifying the second set of digital images using the second set of parameters.

4. The system of claim 3, wherein the at least one processing device is further configured to:
    continuously compare the classification accuracy of the H-CNN and the classification accuracy of the S-CNN;
    determine that the classification accuracy of the S-CNN is greater than the classification accuracy of the H-CNN based on at least the continuous comparison; and
    continue the implementation of the S-CNN on the image processing technical environment.

5. The system of claim 4, wherein the at least one processing device is further configured to:
    electronically receive a third set of digital images from the digital image data repository to be used as the validation dataset to test the H-CNN;
    classify the third set of digital images using the H-CNN using the modified first set of parameters; and
    determine the classification accuracy of the H-CNN based on at least classifying the third set of digital images using the modified first set of parameters.

6. The system of claim 5, wherein the at least one processing device is further configured to:
    classify the third set of digital images using the S-CNN using the second set of parameters; and
    determine a classification accuracy of the S-CNN based on at least classifying the third set of digital images using the second set of parameters.

7. The system of claim 6, wherein the at least one processing device is further configured to:
    determine that the classification accuracy of the H-CNN is greater than the classification accuracy of the S-CNN based on at least the continuous comparison; and
    replace the S-CNN currently implemented on the image processing technical environment with the H-CNN.

8. A computer program product for integration of a hexagonal convolutional neural network (H-CNN) within an image processing technical environment, the computer program product comprising a non-transitory computer-readable medium comprising code causing a first apparatus to:
    initiate a hexagonal convolutional neural network (H-CNN), wherein the H-CNN is configured to receive a first set of digital images from a digital image data repository to be used to train the H-CNN;
    establish a communication link with an image processing technical environment, wherein the image processing technical environment comprises a square convolutional neural network (S-CNN), wherein the S-CNN is configured to receive the first set of digital images from the digital image data repository to be used to train the S-CNN;
    train the H-CNN using the first set of digital images, wherein training the H-CNN comprises generating a first set of parameters for classification;
    train the S-CNN using the first set of digital images, wherein training the S-CNN comprises generating a second set of parameters for classification;
    electronically receive a second set of digital images from the digital image data repository to be used as a validation dataset to test the S-CNN;
    classify the second set of digital images using the S-CNN using the second set of parameters;
    electronically receive an indication that the S-CNN has misclassified at least one of the second set of digital images;
    transform the at least one of the second set of digital images misclassified by the S-CNN as additional training data for the H-CNN; and
    re-train the H-CNN with the additional training data, wherein re-training the H-CNN further comprises modifying the first set of parameters for classification.

9. The computer program product of claim 8, wherein the first apparatus is further configured to:
    classify the second set of digital images using the H-CNN using the first set of parameters; and
    determine a classification accuracy of the H-CNN based on at least classifying the second set of digital images using the first set of parameters.

10. The computer program product of claim 9, wherein the first apparatus is further configured to:
    determine a classification accuracy of the S-CNN based on at least classifying the second set of digital images using the second set of parameters.

11. The computer program product of claim 10, wherein the first apparatus is further configured to:
    continuously compare the classification accuracy of the H-CNN and the classification accuracy of the S-CNN;
    determine that the classification accuracy of the S-CNN is greater than the classification accuracy of the H-CNN based on at least the continuous comparison; and
    continue the implementation of the S-CNN on the image processing technical environment.

12. The computer program product of claim 11, wherein the first apparatus is further configured to:
    electronically receive a third set of digital images from the digital image data repository to be used as the validation dataset to test the H-CNN;
    classify the third set of digital images using the H-CNN using the modified first set of parameters; and
    determine the classification accuracy of the H-CNN based on at least classifying the third set of digital images using the modified first set of parameters.

13. The computer program product of claim 12, wherein the first apparatus is further configured to:
    classify the third set of digital images using the S-CNN using the second set of parameters; and
    determine a classification accuracy of the S-CNN based on at least classifying the third set of digital images using the second set of parameters.

14. The computer program product of claim 13, wherein the first apparatus is further configured to:
    determine that the classification accuracy of the H-CNN is greater than the classification accuracy of the S-CNN based on at least the continuous comparison; and
    replace the S-CNN currently implemented on the image processing technical environment with the H-CNN.

15. A method for integration of a hexagonal convolutional neural network (H-CNN) within an image processing technical environment, the method comprising:
    initiating a hexagonal convolutional neural network (H-CNN), wherein the H-CNN is configured to receive a first set of digital images from a digital image data repository to be used to train the H-CNN;
    establishing a communication link with an image processing technical environment, wherein the image processing technical environment comprises a square convolutional neural network (S-CNN), wherein the S-CNN is configured to receive the first set of digital images from the digital image data repository to be used to train the S-CNN;

training the H-CNN using the first set of digital images, wherein training the H-CNN comprises generating a first set of parameters for classification;

training the S-CNN using the first set of digital images, wherein training the S-CNN comprises generating a second set of parameters for classification;

electronically receiving a second set of digital images from the digital image data repository to be used as a validation dataset to test the S-CNN;

classifying the second set of digital images using the S-CNN using the second set of parameters;

electronically receiving an indication that the S-CNN has misclassified at least one of the second set of digital images;

transforming the at least one of the second set of digital images misclassified by the S-CNN as additional training data for the H-CNN; and re-training the H-CNN with the additional training data, wherein re-training the H-CNN further comprises modifying the first set of parameters for classification.

16. The method of claim 15, wherein the method further comprises:

classifying the second set of digital images using the H-CNN using the first set of parameters; and determining a classification accuracy of the H-CNN based on at least classifying the second set of digital images using the first set of parameters.

17. The method of claim 16, wherein the method further comprises:

determining a classification accuracy of the S-CNN based on at least classifying the second set of digital images using the second set of parameters.

18. The method of claim 17, wherein the method further comprises:

continuously comparing the classification accuracy of the H-CNN and the classification accuracy of the S-CNN;

determining that the classification accuracy of the S-CNN is greater than the classification accuracy of the H-CNN based on at least the continuous comparison; and continuing the implementation of the S-CNN on the image processing technical environment.

19. The method of claim 18, wherein the method further comprises:

electronically receiving a third set of digital images from the digital image data repository to be used as the validation dataset to test the H-CNN;

classifying the third set of digital images using the H-CNN using the modified first set of parameters; and determining the classification accuracy of the H-CNN based on at least classifying the third set of digital images using the modified first set of parameters.

20. The method of claim 19, wherein the method further comprises:

classifying the third set of digital images using the S-CNN using the second set of parameters; and determining a classification accuracy of the S-CNN based on at least classifying the third set of digital images using the second set of parameters.

* * * * *